US012610226B2

(12) United States Patent
Neuhaeuser

(10) Patent No.: US 12,610,226 B2
(45) Date of Patent: Apr. 21, 2026

(54) METHOD AND SYSTEM FOR PROVIDING A COMMUNICATION FUNCTION IN A MEANS OF TRANSPORT

(71) Applicant: Bayerische Motoren Werke Aktiengesellschaft, Munich (DE)

(72) Inventor: Michael Neuhaeuser, Sankt Wolfgang (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 372 days.

(21) Appl. No.: 18/023,493

(22) PCT Filed: Jul. 22, 2021

(86) PCT No.: PCT/DE2021/100638
§ 371 (c)(1),
(2) Date: Feb. 27, 2023

(87) PCT Pub. No.: WO2022/057968
PCT Pub. Date: Mar. 24, 2022

(65) Prior Publication Data
US 2023/0308858 A1     Sep. 28, 2023

(30) Foreign Application Priority Data
Sep. 17, 2020   (DE) .................... 10 2020 124 249.2

(51) Int. Cl.
*H04W 8/18*        (2009.01)
*H04L 67/12*       (2022.01)
(52) U.S. Cl.
CPC ............. *H04W 8/183* (2013.01); *H04L 67/12* (2013.01)

(58) Field of Classification Search
CPC .... H04W 8/183; H04L 67/12; G06Q 10/0631
See application file for complete search history.

(56) References Cited

U.S. PATENT DOCUMENTS

| | | | | |
|---|---|---|---|---|
| 9,788,190 | B2* | 10/2017 | Park .................... | H04L 63/0853 |
| 2014/0380442 | A1* | 12/2014 | Addepalli ............. | B60W 50/10 |
| | | | | 726/6 |
| 2015/0120135 | A1* | 4/2015 | Lawrenson ........... | B60R 16/037 |
| | | | | 701/36 |
| 2016/0295543 | A1 | 10/2016 | Adams et al. | |
| 2017/0289788 | A1* | 10/2017 | Lalwaney ............... | H04W 8/24 |

(Continued)

OTHER PUBLICATIONS

International Search Report (PCT/ISA/210) issued in PCT Application No. PCT/DE2021/100638 dated Oct. 7, 2021 with English translation (four (4) pages).

(Continued)

*Primary Examiner* — Dhaval V Patel
(74) *Attorney, Agent, or Firm* — Crowell & Moring LLP

(57) ABSTRACT

A method for providing a communication function in a means of transport includes receiving, in a central unit of a communication service provider, a request to use a communication profile present in a means of transport, the request relating to assigning the communication profile to a specific user, and assigning, via the central unit of the communication service provider, the communication profile present in the means of transport to the specific user on the basis of the request in order to make the communication profile usable for the user in the means of transport.

18 Claims, 2 Drawing Sheets

100

Receiving, in a central unit of a communication service provider, a request for using a communication profile present in a means of transport, the request relating to an assignment of the communication profile to a specific user — 110

Assigning, by the central unit of the communication service provider, the communication profile present in the means of transport to the specific user based on the request, in order to make the communication profile usable for the user in the means of transport — 120

(56) References Cited

U.S. PATENT DOCUMENTS

2020/0092711 A1 * 3/2020 Chen ................... H04W 8/205

OTHER PUBLICATIONS

German-language Written Opinion (PCT/ISA/237) issued in PCT Application No. PCT/DE2021/100638 dated Oct. 7, 2021 (seven (7) pages).
German-language Search Report issued in German Application No. 10 2020 124 249.2 dated May 17, 2021 with partial English translation (14 pages).
Anonymous. "eUICC—The Future for SIM Technology—Pod Group" Jul. 12, 2020 (Jul. 12, 2020), XP055845144, Retrieved from the Internet: https://web.archive.org/web/20210921143830/https://www.podgroup.com/resources/insights/what-is-euicc/, dated Jul. 12, 2020 (five (5) pages).

* cited by examiner

Figure 1:
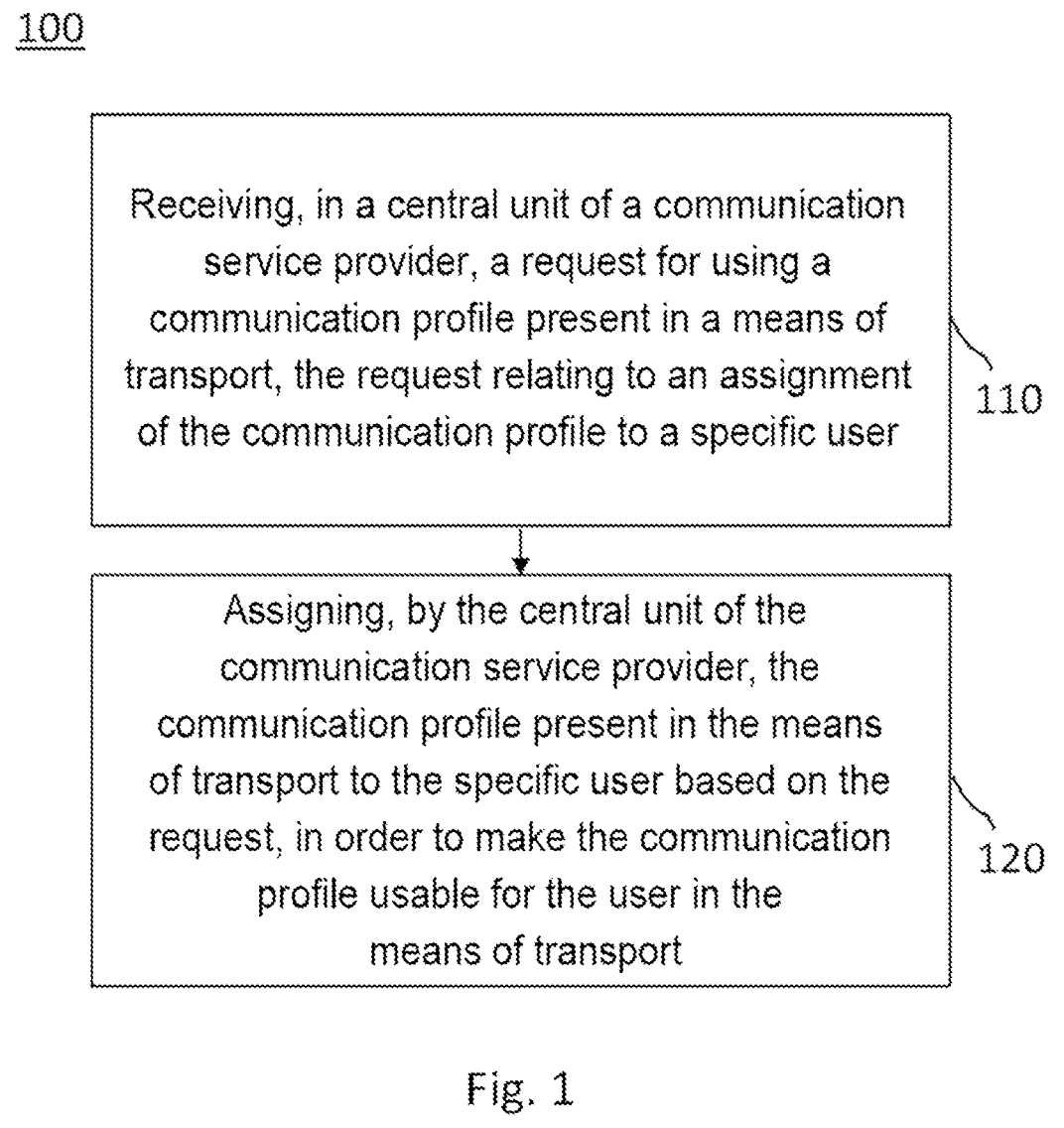

100

Receiving, in a central unit of a communication service provider, a request for using a communication profile present in a means of transport, the request relating to an assignment of the communication profile to a specific user

110

Assigning, by the central unit of the communication service provider, the communication profile present in the means of transport to the specific user based on the request, in order to make the communication profile usable for the user in the means of transport

METHOD AND SYSTEM FOR PROVIDING A COMMUNICATION FUNCTION IN A MEANS OF TRANSPORT

FIELD

The present disclosure relates to a method for providing a communication function in a means of transport, to a storage medium for performing the method and to a system for providing a communication function in a means of transport. The present disclosure relates in particular to a flexible provision of a communication capability to a user in means of transport such as vehicles.

BACKGROUND AND SUMMARY

The networking of modern vehicles, with the Internet for example, is becoming increasingly important. For example, cloud-based services can be provided to the user in the vehicle. To be able to use these and other services, the vehicle comprises a communication module which uses a SIM card and a digital certificate present on the SIM card for communication for example.

In recent times a trend for shared usage of vehicles such as car-sharing has been observed. It is cumbersome or impossible for users of vehicles in the car-sharing fleet to use their own communication profile in the vehicle.

An object of the present disclosure is to specify a method for providing a communication function in a means of transport, a storage medium for performing the method and a system for providing a communication function in a means of transport which are able to implement an individual communication function in a temporarily used vehicle, for example. It is also an object of the present disclosure to simplify a management of communication profiles.

This object is achieved by the subject matter as disclosed herein. Advantageous configurations are also disclosed herein.

According to one independent aspect of the present disclosure, a method is specified for providing a communication function in a means of transport, in particular a motor vehicle. The method comprises receiving, in a central unit of a communication service provider, a request to use a communication profile present or installed in a means of transport, the request relating to an assignment of the communication profile to a specific user; and a (temporary) assignment, by the central unit of the communication service provider, of the communication profile present in the means of transport to the specific user based on the request, in order to make the communication profile usable for the user in the means of transport. In particular, the communication profile can enable a data service and/or a message service and/or a voice service.

According to the present disclosure, a "blank" communication profile installed in the means of transport is temporarily assigned to a specific user so that the user can use the communication profile in the means of transport. When the user surrenders the means of transport, the assignment can be deleted so that the communication profile can be assigned to another user if needed. Thus it is not necessary for a separate communication profile to be generated, loaded and installed for each user, in particular because a single pre-installed communication profile can be flexibly assigned to different users.

The communication service provider can be a manufacturer, a manager, etc. of the communication profile and in particular can be a network operator of a mobile network (mobile telephone company or mobile network operator (MNO)). The communication service provider can enable, for example, communication in a mobile network according to the LTE (Long-Term Evolution) standard and/or the 5G standard.

It is possible to distinguish fundamentally, for example, between at least three entities or parties: the OEM (original equipment manufacturer), the SIM manufacturer, and at least one MNO (e.g. a first MNO and a second MNO). In some embodiments the "blank" communication profile can always be assigned to a specific MNO and temporarily assigned to the user. The present disclosure is not limited to this, however, and the "blank" communication profile can be used for multiple MNOs.

The communication profile is preferably not assigned to any user prior to the assignment by the central unit of the communication service provider. In other words, the communication profile is a "blank" communication profile that is initially not assigned to any specific user. The communication profile can be assigned for example to the vehicle and/or a vehicle manufacturer, however. The present disclosure is not limited to this, however, and the embodiments can be applied in industries other than the vehicle industry.

The request is preferably transmitted by a central unit of a means of transport administration to the central unit of the communication service provider. In some embodiments, the central unit of the means of transport administration can be a back end of a vehicle manufacturer, a car-sharing company, a car rental company, etc. The central unit of the means of transport administration is designed to communicate with the means of transport and to manage functions of the means of transport. The central unit of the means of transport administration is additionally designed to communicate with the central unit of the communication service provider in order to request the assignment of the user to the communication profile.

The request preferably comprises information in relation to the communication profile (e.g. identification information of the communication profile) and/or the specific user (e.g. identification information of the user). In particular, all information (e.g. MNO token, device information, SIM information, profile information, etc.) necessary to assign the communication profile to the user and make it usable by the user can be provided to the central unit of the communication service provider. In some embodiments, the request can comprise data necessary for authorizing the assignment of the communication profile to the user.

The method preferably further comprises receiving a user input for usage of the communication profile present in the means of transport, the request being transmitted to the central unit of the communication service provider on the basis of the user input. For example, the user can log in with their login data in the means of transport, whereupon the request is transmitted to the central unit of the communication service provider.

The login can be performed by the user directly in the means of transport, for example. The user can input their login data into a user interface such as a touchscreen that is integrated into the means of transport, for example. The user interface is not limited thereto, however, and the user interface can be configured for voice recognition, Face ID, etc. Alternatively, the login can be performed by means of a user's mobile terminal device. For example, the user can execute an app on the mobile terminal device in order to perform the login. The present disclosure is not limited thereto, however, and the mobile terminal device can be configured for voice recognition, Face ID, etc.

The term mobile terminal device includes, in particular, smartphones but also other mobile telephones or cell phones, personal digital assistants (PDAs), tablet PCs and all current and future electronic devices that are equipped with a technology for loading and executing apps, for example.

The login is registered and/or authorized in the central unit of the means of transport administration, whereupon the central unit of the means of transport administration transmits the request to the central unit of the communication service provider. The request can be transmitted either automatically or after a prompt/confirmation by the user.

The method preferably further comprises a removal of the assignment of the specific user to the communication profile in order to enable usage of the communication profile by other users. The communication profile itself remains unaffected in the means of transport; only the assignment in the back end is canceled. Due to the removal of the assignment of the specific user, the communication profile again becomes a "blank" communication profile, which can then be assigned to another user. For example, the other user can be a user who uses the means of transport after the previous user.

The assignment is preferably removed based on a further user input. For example, the further user input can be a logout by the user. The logout can be performed directly in the means of transport, for instance. For example, the user can utilize the user interface, such as a touchscreen, integrated into the means of transport in order to log out. The logout can also be accomplished by means of the user's mobile terminal device. In a further alternative example, the user input can be a new request by a different user to use the communication profile.

The logout is registered and/or authorized in the central unit of the means of transport administration, whereupon the central unit of the means of transport administration transmits a further request to the central unit of the communication service provider in order to cause the central unit of the communication service provider to delete the assignment. The request to delete the assignment can be transmitted either automatically or after a prompt/confirmation by the user.

The communication profile is preferably a SIM profile and in particular an eSIM profile of the user. The use of a conventional plastic SIM card is also possible. The SIM or eSIM (embedded subscriber identity module) is a standardized method for secure embedding of subscriber information in a module of a device for telecommunication. Security and data confidentiality are crucial for the communication by means of the eSIM. For this purpose, the module includes a standardized digital certificate. A large number of different certificates exist around the world, a specific type of eSIM being functional or usable only with a specific type of certificate. The term communication profile includes in particular SIM profiles, but also other current and future communication profiles that enable a communication function.

The communication that is performed according to the embodiments of the present disclosure to provide the communication function can be carried out via a device that is hard-wired to or wirelessly connected to the means of transport, for example. The device can be for example a mobile terminal device which is connected, for example, via Bluetooth to the means of transport. The term mobile terminal device comprises in particular, smartphones but also other mobile telephones or cell phones, personal digital assistants (PDAs), tablet PCs, notebooks, smart watches and all current and future electronic devices that are equipped with a communication technology.

In further embodiments, the communication for providing the communication function can be performed via a device that is fixedly installed in the means of transport, such as a DSDA modem, and using a further communication profile (e.g. a further SIM profile). Additionally or alternatively, the communication for providing the communication function can be performed via a dedicated communication profile.

According to a further independent aspect of the present disclosure, a software (SW) program is specified. The SW program can be configured to be executed on one or more processors and thereby carry out the method described in this document for providing a communication function in a means of transport.

According to a further independent aspect of the present disclosure, a storage medium is specified. The storage medium can comprise an SW program that is configured to be executed on one or more processors and thereby carry out the method described in this document for providing a communication function in a means of transport, in particular a vehicle.

According to a further independent aspect of the present disclosure, a system is specified for providing a communication function in a means of transport, in particular a vehicle. The system comprises one or more processors which are configured to receive a request for using a communication profile present in a means of transport, the request relating to an assignment of the communication profile to a specific user; and, based on the request, to assign the communication profile to the specific user in order to make the communication profile usable for the user in the means of transport. In particular, the communication profile can enable a data service and/or a message service and/or a voice service.

The system is preferably a central unit, such as a back end, of a communication service provider.

The means of transport is preferably a vehicle and in particular a motor vehicle. The means of transport can be a vehicle (e.g. a motor vehicle), a ship or an aircraft (e.g. a drone for passenger traffic), but is not limited thereto. For example, the means of transport can also be a shoe or other portable utensil (e.g. wearables, articles of clothing, etc.). The term vehicle comprises passenger vehicles, trucks, buses, recreational vehicles, motorcycles, etc., which are used for transporting people, goods, etc. In particular, the term comprises motor vehicles for passenger transport.

The means of transport preferably comprises a communication module. The communication module can be configured for communication according to the LTE (Long-Term Evolution) standard or the 5G standard.

In particular, the communication module of the means of transport can be configured in some embodiments to communicate wirelessly in a mobile network with the central unit of the means of transport administration and/or the central unit of the communication service provider and/or a user's mobile terminal device. A communication via further current or future communication technologies is possible. The present disclosure is not limited to the mobile radio standard, however, and non-mobile radio standards can be used.

For example, the communication module is a device which is capable of communicating wirelessly in a mobile network via local area networks (LANs) such as wireless LAN (WiFi/WLAN) or via wide area networks (WANs) such as the Global System for Mobile Communication (GSM), General Package Radio Service (GPRS), Enhanced Data Rates for Global Evolution (EDGE), Universal Mobile Telecommunications System (UMTS), High-Speed Downlink/Uplink Packet Access (HSDPA, HSUPA), Long-Term Evolution (LTE), 5G or Worldwide Interoperability for Microwave Access (WIMAX).

According to a further independent aspect of the present disclosure, a means of transport, in particular a vehicle such as a motor vehicle, is specified. The means of transport comprises a communication module according to the embodiments of the present disclosure.

BRIEF DESCRIPTION OF THE DRAWINGS

Exemplary embodiments of the disclosure are shown in the figures and will be described in detail below.

BRIEF DESCRIPTION OF THE DRAWINGS

Figure 2:
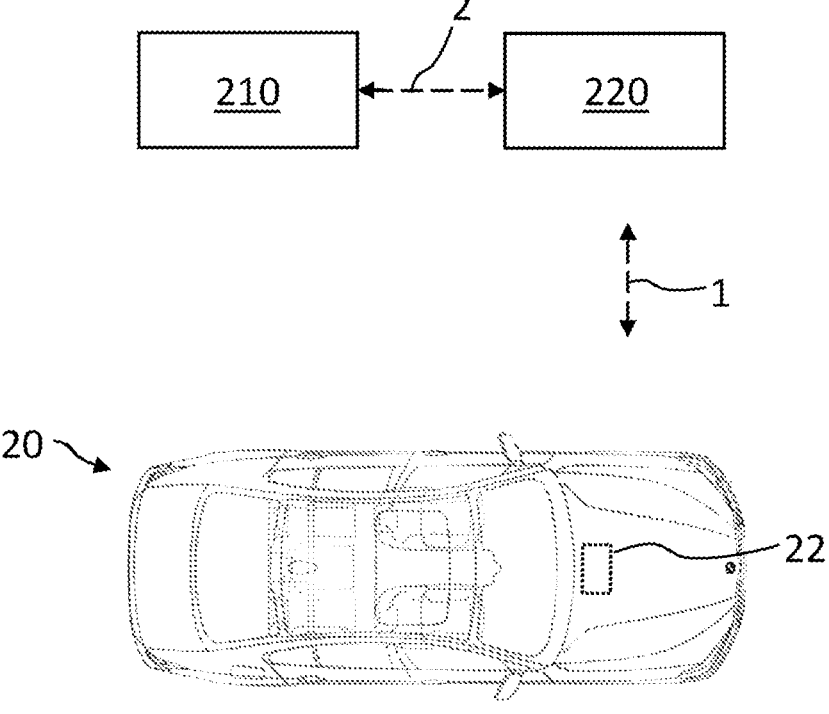

FIG. 1 shows a flow diagram of a method according to the embodiments of the present disclosure for providing a communication function in a means of transport, and FIG. 2 schematically shows a system for providing a communication function in a means of transport according to embodiments of the present disclosure.

DETAILED DESCRIPTION

Unless otherwise noted, identical reference signs will be used below for identical and identically functioning elements.

FIG. 1 shows a flow diagram of a method 100 according to embodiments of the present disclosure for providing a communication function in a means of transport. The method 100 can be implemented by corresponding software which can be executed by one or more processors (e.g. a CPU).

In block 110, the method 100 comprises receiving, in a central unit of a communication service provider, a request to use a communication profile present in a means of transport, the request relating to an assignment of the communication profile to a specific user; and comprises, in block 120, an assignment, by the central unit of the communication service provider, of the communication profile present in the means of transport to the specific user based on the request, in order to make the communication profile usable for the user in the means of transport.

Thus a new communication profile need not be generated and loaded when multiple persons wish to use the same device (communication module or means of transport) successively. Nor is it necessary for a previously downloaded user-specific communication profile to be deleted when the means of transport is exchanged, and therefore a possible source of error can be avoided. This is particularly advantageous for car-sharing because it is not necessary for a communication profile to be generated, readied for download, downloaded, installed and then again securely deleted for a brief rental process.

FIG. 2 schematically shows a system for providing a communication function in a means of transport according to embodiments of the present disclosure. The means of transport can be a vehicle and in particular a motor vehicle 20.

FIG. 2 schematically shows the vehicle 20 having a communication module 22, the central unit of the communication service provider 210 and the central unit 220 of the means of transport administration.

The central unit 220 of the means of transport administration can communicate via a first communication link 1 with the means of transport 20 or more specifically the communication module 22 of the means of transport 20. For example, the first communication link 1 can be implemented by using a mobile network. The mobile network can be an LTE network or a 5G network, for instance.

The central unit 210 of the communication service provider can communicate via a second communication link 2 with the central unit 220 of the means of transport administration.

In some embodiments, the user in the vehicle 20 can log in with their login data in order to use the vehicle 20 temporarily, for example in the context of car-sharing. The login can be performed by the user directly in the vehicle 20, for example. The user can input their login data into a user interface such as a touchscreen that is integrated into the vehicle 20, for example. Alternatively, the login can be performed by means of a user's mobile terminal device (not shown). For example, the user can execute an app on the mobile terminal device in order to perform the login. For this purpose, the mobile terminal device can communicate directly with the central unit 220 of the means of transport administration via a mobile network in some embodiments.

The login is registered and/or authorized in the central unit 220 of the means of transport administration, whereupon the central unit 220 of the means of transport administration transmits a request to the central unit 210 of the communication service provider to assign the user to a communication profile installed in the vehicle 20. The request can be transmitted either automatically or after a prompt/confirmation by the user.

The central unit 210 of the communication service provider assigns the communication profile present in the vehicle 20 to the user based on the request, so that the communication profile is usable by the user in the vehicle 20.

The communication profile can be a SIM profile, for example. In particular, the communication profile can enable a data service and/or a message service and/or a voice service.

According to the present disclosure, a "blank" communication profile installed in the means of transport is temporarily assigned to a specific user so that the user can use the communication profile in the means of transport. When the user surrenders the means of transport, the assignment can be deleted so that the communication profile can be assigned to another user if needed. Thus it is not necessary for a separate communication profile to be generated, loaded and installed for each user, in particular because a single pre-installed communication profile can be flexibly assigned to different users.

Although the invention has been illustrated and explained in detail by preferred exemplary embodiments, the invention is not restricted by the disclosed examples, and other variations can be derived therefrom by a person skilled in the art without going beyond the scope of protection of the invention. It is therefore clear that multiple variation possibilities exist. It is likewise clear that embodiments mentioned for the sake of example actually are only examples, which should by no means be considered restrictions of the scope of protection, the application possibilities or the configuration of the invention. On the contrary, the above description and the description of the figures put a person skilled in the art in a position to implement the exemplary embodiments concretely, wherein a person skilled in the art with knowledge of the disclosed inventive concept can undertake many modifications for example with respect to the function or the arrangement of individual elements set forth in an exemplary embodiment without going beyond the scope of protection, which is defined by the claims and their legal equivalents, such as the further explanations in the description.

The invention claimed is:

1. A method for providing a communication function in a vehicle, comprising:

receiving, in a central unit of a communication service provider, a request for using a communication profile present in the vehicle, the request relating to an assignment of the communication profile to a specific user; and temporarily assigning, by the central unit of the communication service provider, the communication profile present in the vehicle to the specific user based on the request, in order to make the communication profile usable for the user in the vehicle;

wherein no user is assigned to the communication profile prior to the temporary assignment by the central unit of the communication service provider.

2. The method according to claim 1, further comprising:

transmitting the request by a central unit of a vehicle administration to the central unit of the communication service provider.

3. The method according to claim 1, wherein the request comprises information in relation to the communication profile and/or the specific user.

4. The method according to claim 1, further comprising:

receiving a user input for usage of the communication profile present in the vehicle, the request being transmitted to the central unit of the communication service provider on a basis of the user input.

5. The method according to claim 1, further comprising:

removing the assignment of the specific user to the communication profile in order to enable assignment to and usage of the communication profile by other users.

6. The method according to claim 5, further comprising removing the assignment on a basis of a further user input.

7. The method according to claim 1, wherein the communication profile is an eSIM profile.

8. A non-transitory computer-readable medium having a software program stored thereon that, when executed on one or more processors, cause the one or more processors to perform a method comprising:

receiving, in a central unit of a communication service provider, a request for using a communication profile present in a vehicle, the request relating to an assignment of the communication profile to a specific user; and temporarily assigning, by the central unit of the communication service provider, the communication profile present in the vehicle to the specific user based on the request, in order to make the communication profile usable for the user in the vehicle;

wherein no user is assigned to the communication profile prior to the temporary assignment by the central unit of the communication service provider.

9. The non-transitory computer-readable medium according to claim 8, wherein the method further comprises:

transmitting the request by a central unit of a vehicle administration to the central unit of the communication service provider.

10. The non-transitory computer-readable medium according to claim 8, wherein the method further comprises:

receiving a user input for usage of the communication profile present in the vehicle, the request being transmitted to the central unit of the communication service provider on a basis of the user input.

11. The non-transitory computer-readable medium according to claim 8, wherein the method further comprises:

removing the assignment of the specific user to the communication profile in order to enable assignment to and usage of the communication profile by other users.

12. A system for providing a communication function in a vehicle comprising one or more processors that are configured to:

receive a request for using a communication profile present in the vehicle, the request relating to an assignment of the communication profile to a specific user; and based on the request, temporarily assign the communication profile to the specific user in order to make the communication profile usable for the user in the vehicle;

wherein no user is assigned to the communication profile prior to the assignment by the central unit of the communication service provider.

13. The system according to claim 12, wherein the one or more processors are further configured to:

transmit the request by a central unit of a vehicle administration to the central unit of the communication service provider.

14. The system according to claim 12, wherein the request comprises information in relation to the communication profile and/or the specific user.

15. The system according to claim 12, wherein the one or more processors are further configured to:

receive a user input for usage of the communication profile present in the vehicle, the request being transmitted to the central unit of the communication service provider on a basis of the user input.

16. The system according to claim 12, wherein the one or more processors are further configured to:

remove the assignment of the specific user to the communication profile in order to enable assignment to and usage of the communication profile by other users.

17. The system according to claim 16, wherein the one or more processors are further configured to:

remove the assignment on a basis of a further user input.

18. The system according to claim 12, wherein the communication profile is an eSIM profile.

* * * * *